US012537352B2

(12) United States Patent
Nordin et al.

(10) Patent No.: US 12,537,352 B2
(45) Date of Patent: Jan. 27, 2026

(54) COMBINATION OUTLET

(71) Applicant: Panduit Corp., Tinley Park, IL (US)

(72) Inventors: Ronald A. Nordin, Naperville, IL (US); Masud Bolouri-Saransar, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 610 days.

(21) Appl. No.: 17/957,168

(22) Filed: Sep. 30, 2022

(65) Prior Publication Data

US 2024/0113484 A1 Apr. 4, 2024

(51) Int. Cl.
*H01R 24/76* (2011.01)
*H01R 105/00* (2006.01)

(52) U.S. Cl.
CPC ......... *H01R 24/76* (2013.01); *H01R 2105/00* (2013.01)

(58) Field of Classification Search
CPC ............................ H01R 24/76; H01R 2105/00
See application file for complete search history.

(56) References Cited

U.S. PATENT DOCUMENTS

| | | | | |
|---|---|---|---|---|
| 6,796,824 | B2 * | 9/2004 | Dewitt | H01R 13/5202 439/271 |
| 7,722,380 | B1 * | 5/2010 | West | H01R 13/6395 439/373 |
| 7,857,654 | B2 * | 12/2010 | West | H01R 13/6395 439/373 |
| 8,283,802 | B2 * | 10/2012 | Jansma | H01R 25/006 439/654 |
| 8,439,697 | B2 * | 5/2013 | Vass | H01R 24/78 439/270 |
| 8,668,512 | B2 * | 3/2014 | Chang | H01R 13/6395 439/304 |
| 8,714,995 | B2 * | 5/2014 | Chang | H01R 13/639 439/345 |
| 8,777,655 | B2 * | 7/2014 | Blanton | H01R 13/6392 439/372 |
| 8,784,126 | B2 * | 7/2014 | Chang | H01R 13/6272 439/358 |
| 8,951,059 | B2 * | 2/2015 | Chang | H01R 13/633 439/346 |
| 9,276,357 | B2 * | 3/2016 | Hutchison | H01R 13/639 |
| 9,735,502 | B2 * | 8/2017 | Stevens | H01R 13/621 |
| 9,832,556 | B2 * | 11/2017 | Akino | H01R 13/187 |
| 9,843,146 | B1 * | 12/2017 | Chen | H01R 13/514 |
| 9,929,510 | B2 * | 3/2018 | Vass | H01R 13/6395 |
| 10,003,163 | B2 * | 6/2018 | Hewitt | H10N 70/826 |
| 10,020,616 | B2 * | 7/2018 | Hartman | H01R 24/20 |
| 10,205,281 | B2 * | 2/2019 | Preuss | H01R 13/639 |

(Continued)

FOREIGN PATENT DOCUMENTS

| | | | |
|---|---|---|---|
| CA | 3077721 | A1 | 5/2019 |
| CN | 211428413 | U | 9/2020 |
| DE | 202016101189 | U1 | 3/2016 |

*Primary Examiner* — Thanh Tam T Le
(74) *Attorney, Agent, or Firm* — Christopher K. Marlow; Christopher S. Clancy; James H. Williams

(57) ABSTRACT

A combination outlet capable of accepting a C14 and C20 plug has a central contact retaining portion and a plurality of tabs surrounding the central contact retaining portion. The tabs are configured to move toward and away from a center of the central contact retaining portion such that the tabs engage an inner surface of a housing of the C20 plug and an exterior surface of a housing of the C14 plug.

1 Claim, 13 Drawing Sheets

(56) References Cited

U.S. PATENT DOCUMENTS

| | | | | |
|---|---|---|---|---|
| 10,249,998 | B2 | 4/2019 | Irons et al. | |
| 10,498,096 | B2 | 12/2019 | Irons et al. | |
| 10,541,501 | B2 * | 1/2020 | Hutchison | H01R 27/00 |
| 10,680,398 | B1 * | 6/2020 | Irons | H01R 25/003 |
| 11,196,212 | B2 | 12/2021 | Ramsey et al. | |
| 11,276,970 | B1 | 3/2022 | Dittus | |
| 11,362,470 | B2 | 6/2022 | Irons et al. | |
| 11,777,255 | B1 * | 10/2023 | Choi | H01R 13/35 439/106 |
| 11,843,203 | B2 * | 12/2023 | Dittus | H01R 24/76 |
| 2022/0115823 | A1 | 4/2022 | Dittus et al. | |

* cited by examiner

Traditional Methods of Distributing Power to IT-Equipment Cabinets

IEC60320 C13 receptacle and C14 plug

IEC60320 C19 receptacle and C20 plug

Combination Outlet
(C13 and C19)

Combination Outlet
Alignment/Retainment Tabs

Plug Insertion into the Combination Outlet

Circular Plunger technique for Plug Alignment and Restrainment

COMBINATION OUTLET

BACKGROUND

The power from the local electric utility must be distributed efficiently to the IT-equipment contained within cabinets in data center facilities (or in enterprise facilities or industrial facilities.) FIG. 1 shows a block diagram of how 3-phase AC power is typically distributed in a data center. The power is typically supplied from a power utility service provider at a high voltage (e.g., 135 kV) and is transformed down to 480 VAC. This power enters the data center facility's main switch gear (along with a backup Diesel generator (D-Gen). The switch gears output is transformed down again (to typically either 208V or 415V) and distributed to Power Distribution Units (PDU) within the data hall. These PDUs distribute power to each of the cabinet in the row of cabinets (utilizing a point-to-point or bus arrangement). Finally, the power entering a cabinet is distributed to each of the IT-equipment within the cabinet, through the Rack Power Distribution Unit (R-PDU). This power is typically distributed in typically 3-phase Delta or Wye configurations to each of the cabinets. The point-to-point or bus method of distribution is described in FIGS. 2A and 2B. The power from the PDU to each of the cabinets (typically in a row) can be bused or routed point to point to the R-PDU. This power distributed to the cabinet (or rack) is than connected to the cabinet's R-PDU where the power is than distributed (in single phase) to each of the IT-equipment contained within the rack (see FIG. 3). The Rack based PDU distributes the power to all the IT-equipment with in the rack. The IT-equipment connectivity to the R-PDU utilizes power cords that can have different types of plugs on the ends. The type of plugs/receptacles typically used are defined in IEC 60320. The receptacle at the R-PDU (i.e., female outlets) are typically C13, C15, or C19, while the receptacles (i.e., male outlets) at the IT-equipment side are typically C14, C16, or C20.

It is desirable to have a receptacle within the R-PDU that is multi-purpose (i.e., C13, C15 or C19). This style of receptacle can than accept a C14, C16 or C20 plug on a power cord that typically connects to IT-equipment within the cabinet. This R-PDU receptacle is called a combination outlet and is the subject of this application.

SUMMARY

In a first embodiment, a combination outlet capable of accepting a C14 and C20 plug has a central contact retaining portion and a plurality of tabs surrounding the central contact retaining portion. The tabs are configured to move toward and away from a center of the central contact retaining portion such that the tabs engage an inner surface of a housing of the C20 plug and an exterior surface of a housing of the C14 plug.

In a second embodiment, a combination outlet capable of accepting a C14 and C20 plug has a central contact retaining portion and first and second sets of plungers surrounding the central contact retaining portion. The housing of the C14 plug is configured to depress the first set of plungers and engage an inner surface of the second set of plungers and a housing of a C20 plug is configured to depress the second set of plungers and engage an outer surface of the first set of plungers when a C14 or C20 plug is inserted into the housing.

In a third embodiment, a combination outlet capable of accepting a C14 and C20 plug comprising a central contact retaining portion and a plurality of circular plungers surrounding the central contact retaining portion wherein a housing of a C14 plug is configured to rotate each circular plunger of the plurality of circular plungers in a first direction and engage an inner surface of each circular plunger and a housing of a C20 plug is configured to rotate each circular plunger in a second direction, opposite the first direction, and engage an outer surface of each circular plunger when a C14 or C20 plug is inserted into the combination outlet.

DETAILED DESCRIPTION OF THE INVENTION

Figure 1:
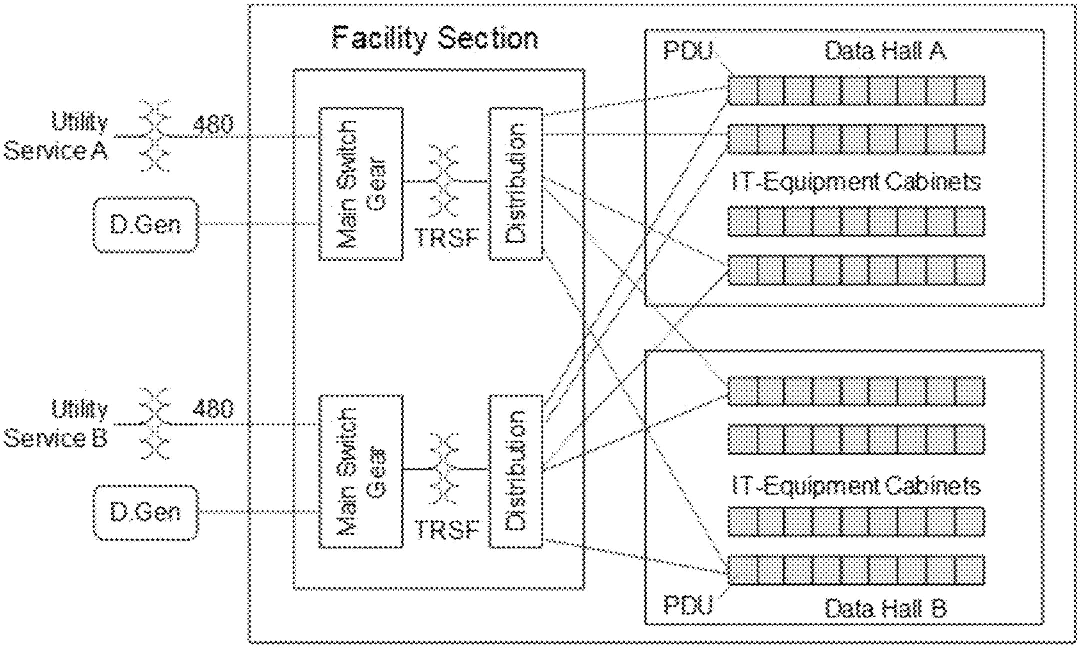
FIG. 1 shows a block diagram of how 3-phase AC power is typically distributed in a data center.
Figure 2A:
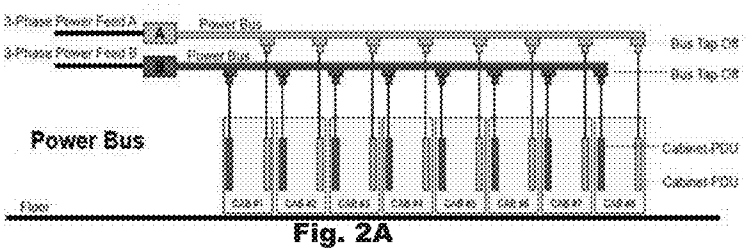
FIGS. 2A and 2B show that the power from the PDU to each of the cabinets (typically in a row) can be used or routed point to point to the R-PDU.
Figure 2B:
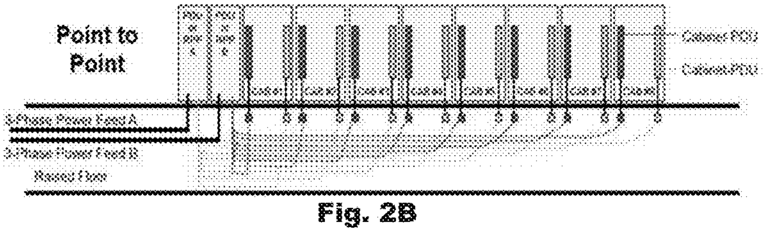
Figure 3:
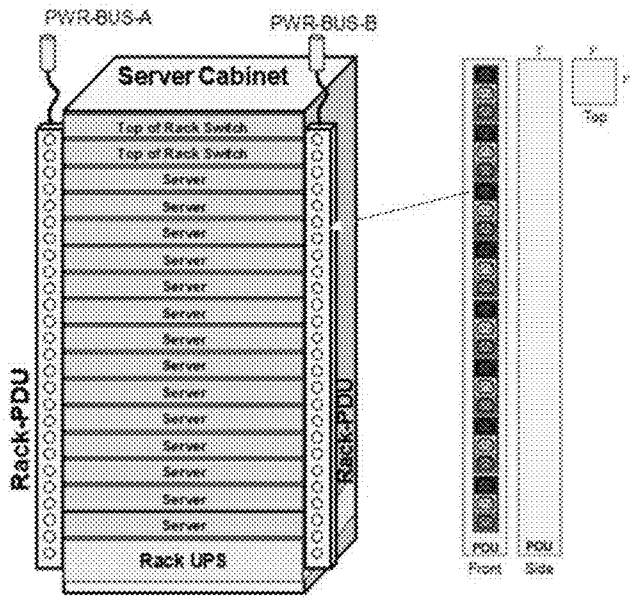
FIG. 3 shows how the R-PDU distributes the power to all the IT-equipment within the rack.
Figure 4A:
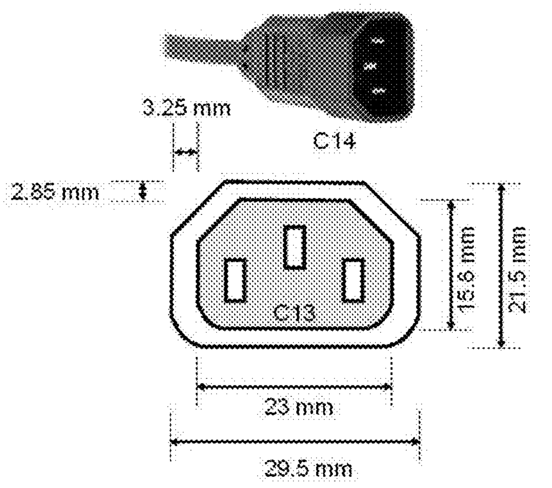
FIGS. 4A and 4B show the two types of power connectors typically used for connecting IT-equipment to the R-PDU.
Figure 4B:
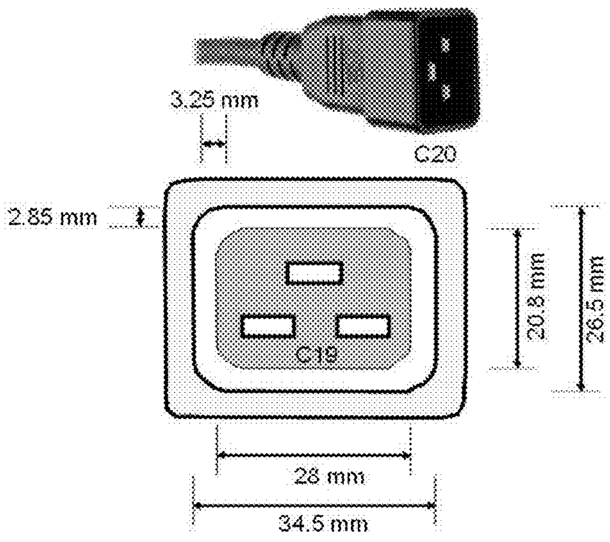

The R-PDU has a significant number of outlets that serve the IT-equipment located within the rack or cabinet. There are typically two types of power connectors that are typically used for connecting IT-equipment to the R-PDU (see FIGS. 4A and 4B). The C13 and C19 receptacles are typically located on the R-PDU and the C14 and C20 receptacles are typically located on the client IT-equipment side. The power cords will hence have a C14/C20 plug end (targeted for the R-PDU) and a C13/C19 plug end (for the client IT-equipment side outlets).

Figure 5A:
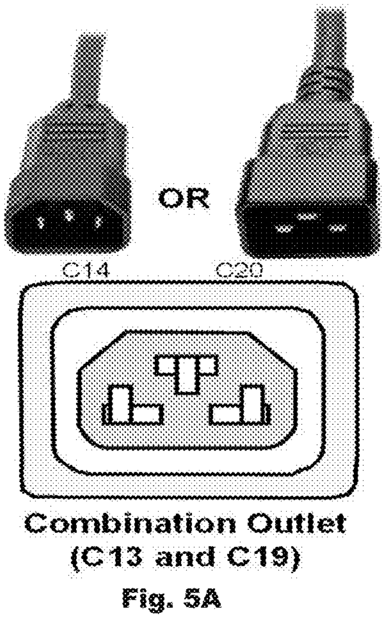
FIGS. 5A and 5B show a first embodiment of a PDU Power combination outlet that can accept multiple types of plugs (e.g., C14 and C20) according to the present invention.
Figure 5B:
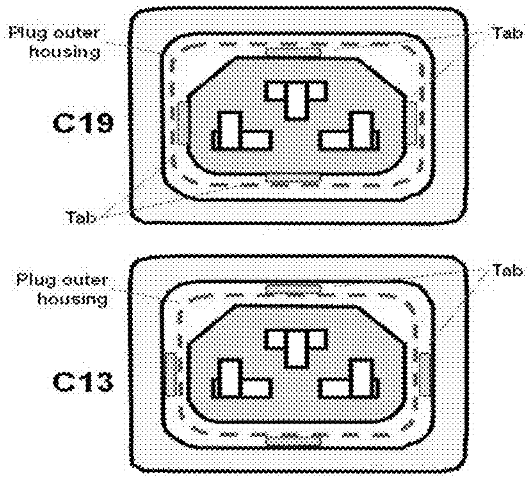

FIGS. 5A and 5B show the first concept of a combination outlet that can accept C14 or C20 plugs. A PDU power combination outlet is shown that can accept multiple types of plugs (e.g., C14 and C20). FIG. 5A shows the C13/C19 combination receptacle on the R-PDU. FIG. 5B shows the combination outlet with moveable tabs surrounding a central contact retaining portion, the tabs assist in aligning and restraining the plug connectors. When a C20 plug in inserted into the combination outlet the alignment/retainment tabs contact the inner surface of the C20 plug housing. When a C14 plug in inserted into the combination outlet the alignment/retainment tabs contact the outer surface of the C14 plug housing. The tabs have two purposes, first to help align the plugs into the outlet and secondly to help retain or restrain the plug in the outlet and not require a locking component. Since it is desirable that the outlet supply a secure fit with the surrounding housing of the C14 or C20 plug, alignment tabs that make contact with either the inside or outside of this housing are provided. These alignment tabs can be manually placed or automatically placed, see FIGS. 6A, 6B, 6C, 7, 8A, 8B and 8C.

Figure 6B:
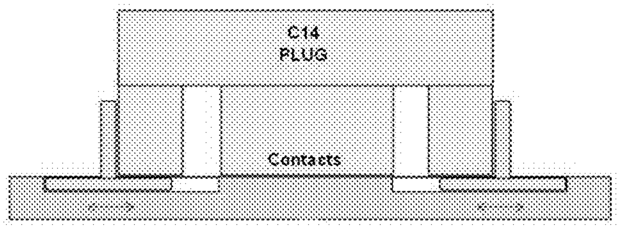
FIGS. 6A, 6B, and 6C show techniques to align either a C14 or C20 plug into the combination outlet.
Figure 6A:
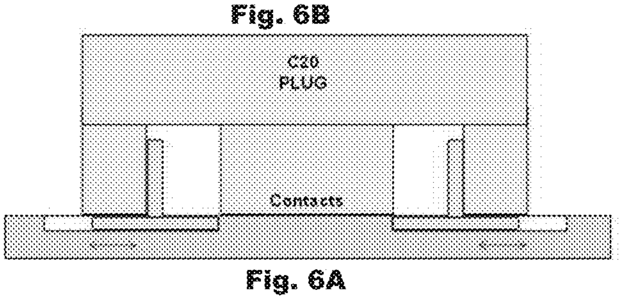
Figure 6C:
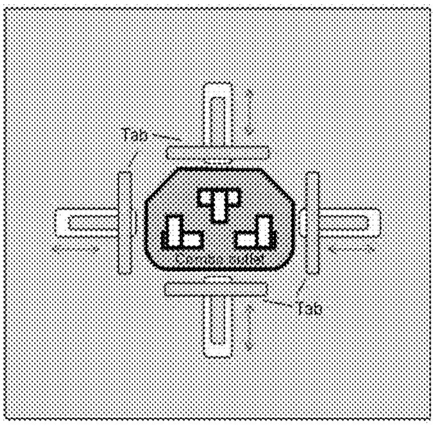

As shown in FIGS. 6A, 6B and 6C, in order to align either a C14 or C20 plug into the combination outlet, alignment tabs are used. FIGS. 6A, 6B and 6C show techniques to align either a C14 or C20 plug into the combination outlet. FIG. 6A shows how the tabs align and restrains the inside wall of the C20 plug while FIG. 6B shows how the tabs align and restrains the outside wall of the C14 plug. FIG. 6C shows a top down view of the combination outlet including the alignment/retraining tabs. In this implementation, the tabs would be moved manually to accommodate the C14 or C20 plug. The tabs are mounted such that when either plug is inserted, they will contact the inner/outer wall of the plug with enough force to restrain them.

Figure 7:
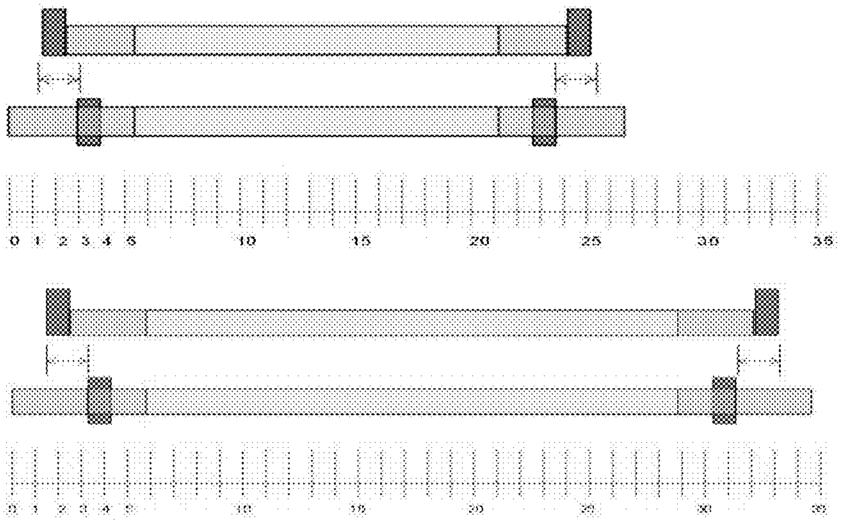
FIG. 7 shows the dimensioning of the alignment tab and the amount of slide it must travel (the dimensions are in mm).

FIG. 7 shows the dimensions that are required for these alignment tabs.

Figure 8B:
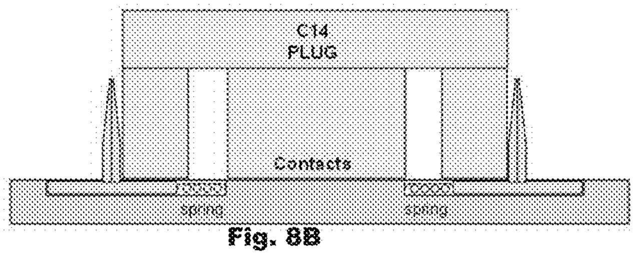
FIGS. 8A, 8B, and 8C show automatic versions of the techniques of FIGS. 6A, 6B, and 6C to align either a C14 or C20 plug into the combination outlet accordingly.
Figure 8A:
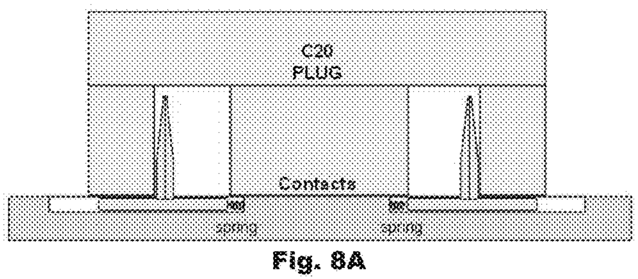
Figure 8C:
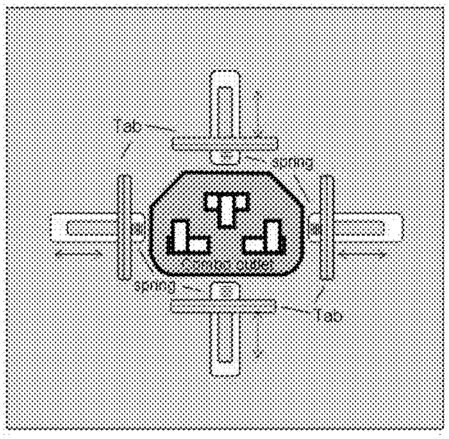

As shown in FIGS. 8A, 8B and 8C, in order to align either a C14 or C20 plug into the combination outlet, alignment tabs under a spring force are utilized. FIG. 8A shows how the tabs align and restrains the inside wall of the C20 plug while FIG. 8B shows how the tabs align and restrains the outside wall of the C14 plug. FIG. 8C shows a top down view of the combination outlet and the alignment/retraining tabs. In this implementation, the tabs would be moved automatically to accommodate the C14 or C20 plug and apply enough force to restrain them in place.

Figures 9A, 9B, 9C:
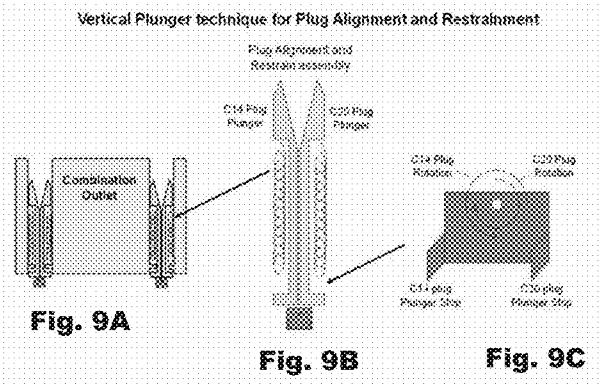
FIGS. 9A, 9B, and 9C show a second embodiment of an automatic technique (utilizing a vertical plunger) to align either a C14 or C20 plug into the combination outlet.

FIGS. 9A, 9B and 9C show a second automatic technique (utilizing vertical plungers surrounding the central contact retaining portion) to align either a C14 or C20 plug into the combination outlet. FIG. 9A shows the combination outlet's plug alignment and restrainment assembly. FIG. 9B shows an expanded view of this assembly and how the C14 or C20 plug engages the plungers. FIG. 9C shows an expanded view of a port of the assembly whose role is to stop the alternative plunger from descending and ensuring that this alternate plunger makes contact to the appropriate plug to help align it and restrain it.

Figure 10A:
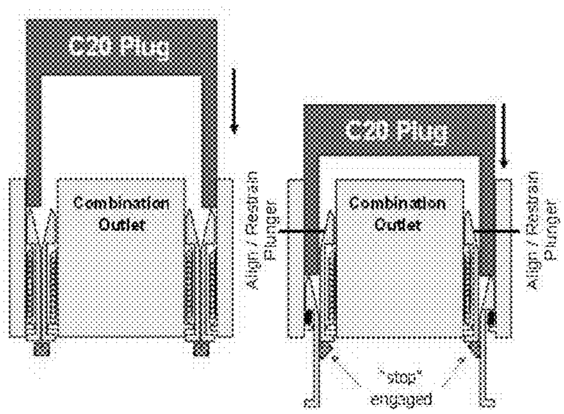
FIGS. 10A and 10B further show the vertical plunger's automatic techniques to align either a C14 or C20 plug into the combination outlet.
Figure 10B:
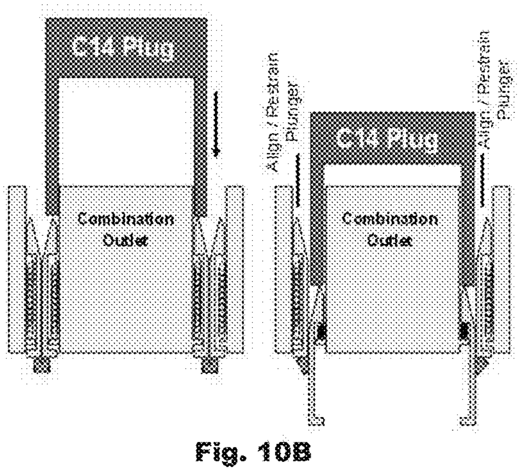

FIGS. 10A and 10B show the vertical plunger's automatic technique to align either a C14 or C20 plug into the combination outlet. FIG. 10A shows the combination outlet's C20 plug alignment and restrainment and FIG. 10B shows the combination outlet's C14 plug alignment and restrainment.

Figure 11A:
FIGS. 11A and 11B show alternative implementations of the concept illustrated in FIGS. 9A, 9B and 9C and FIGS. 10A and 10B (utilizing a set of collars) that align and restrain either a C14 or C20 plug into the combination outlet.
Figure 11B:
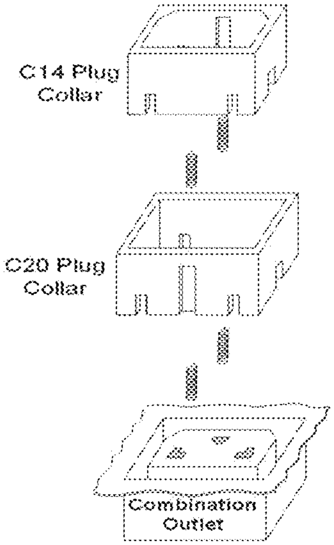

FIGS. 11A and 11B show an alternative implementation of the concept illustrated in FIGS. 9A, 9B and 9C and 10A and 10B (utilizing a set of collars implementing the vertical plungers) that align and restrain either a C14 or C20 plug into the combination outlet. FIG. 11A shows the combination outlet based on his concept, and FIG. 11B shows an exploded view of this assembly and the parts that accommodate the functionality of this embodiment.

Figure 12A:
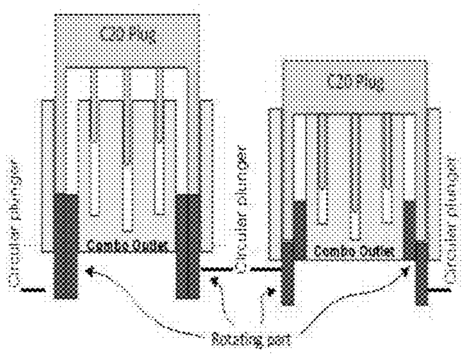
FIGS. 12A and 12B show another automatic technique (utilizing a circular plunger) to align either a C14 or C20 plug into the combination outlet.
Figure 12B:
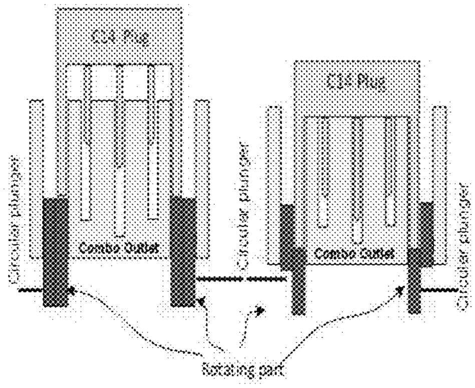
Figure 13A:
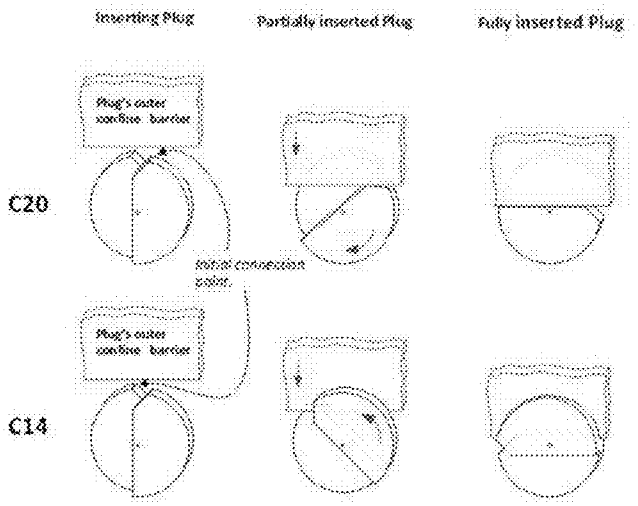
FIGS. 13A and 13B shows the circular plunger assembly that automatically aligns and restrains either a C14 or C20 plug into the combination outlet.
Figure 13B:
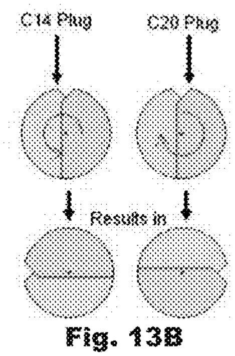
Figure 13C:
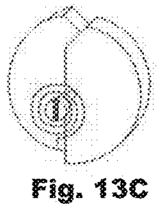

FIGS. 12A and 12B show the third concept for an automatic technique (utilizing a circular plunger) to align either a C14 or C20 plug into the combination outlet. FIG. 12A shows the engagement the circular plunger has with a C20 plug and FIG. 12B shows the engagement the circular plunger has with a C14 plug FIGS. 13A, 13B and 13C show the circular plunger assembly that surrounds the central contact retaining portion and automatically aligns and restrains either a C14 or C20 plug into the combination outlet. FIG. 13A shows both a C14 and a C20 plug engaging the circular plunger assembly and how one side of the plunger rotates, and the alternate side engages the plug to guide it and restrain it. FIG. 13B shows another view of the engagement of the C14 and C20 plug to either side of the circular plunger assembly. FIG. 13C shows the circular plunger with a spring to control the rotation back to a normal position.

What is claimed is:

1. A combination outlet capable of accepting a C14 and C20 plug comprising:

a bottom wall;

a central contact retaining portion extending upwards from the bottom wall; and a plurality of tabs slidably secured to the bottom wall surrounding the central contact retaining portion, wherein the tabs are configured to slide toward and away from a center of the central contact retaining portion such that the tabs engage an inner surface of a housing of the C20 plug and an exterior surface of a housing of the C14 plug.

* * * * *